Figure 1:
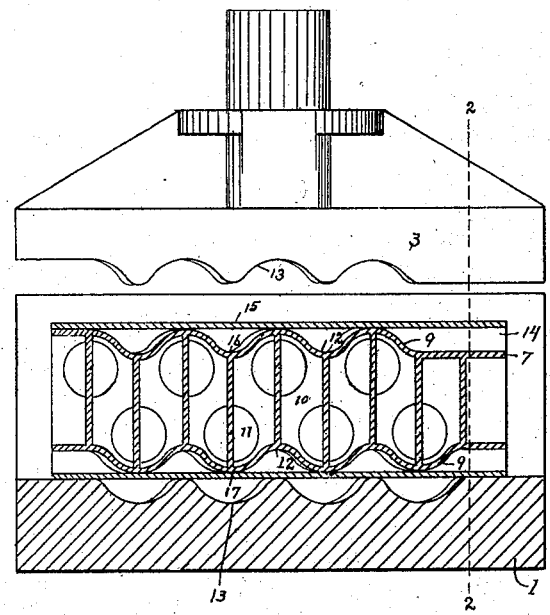

No. 693,179. Patented Feb. 11, 1902.
J. P. SNEDDON.
METHOD OF SHAPING WROUGHT METAL TUBULAR ARTICLES OF IRREGULAR SHAPE.
(Application filed Apr. 12, 1901.)
(No Model.)

Witnesses
Fred D. Sweet
Walter Famariss

Inventor:
James P. Sneddon
By Kay & Totten
Attorneys.

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

METHOD OF SHAPING WROUGHT-METAL TUBULAR ARTICLES OF IRREGULAR SHAPE.

SPECIFICATION forming part of Letters Patent No. 693,179, dated February 11, 1902.

Application filed April 12, 1901. Serial No. 55,548. (No model.)

*To all whom it may concern:*

Be it known that I, JAMES P. SNEDDON, a resident of Barberton, in the county of Summit and State of Ohio, have invented a new and useful Improvement in Methods of Shaping Wrought-Metal Tubular Articles of Irregular Shape; and I do hereby declare the following to be a full, clear, and exact description thereof.

My invention relates to a method of shaping wrought-metal tubular articles of irregular outline, such as serpentine boiler-headers and the like.

Serpentine boiler-headers and similar articles are made from comparatively heavy metal, and as such articles are tubular and irregular in shape considerable difficulty has been experienced in forming them of wrought-iron or steel. By reason of the thickness of the metal composing such articles it requires very heavy pressure to properly shape the same, and in order to prevent the collapsing of the tube during the shaping process it is necessary to use an internal support or mandrel for the same. By reason of the great irregularity in the shape of these articles difficulty has been experienced in providing a suitable internal support or mandrel which will offer sufficient resistance to the action of the external forging or compressing dies and which is nevertheless capable of being withdrawn or removed from the header or other article after the same is shaped. Heretofore serpentine headers and similar articles have been made of wrought-iron only by the use of complicated sectional mandrels composed of movable blocks, which were inserted in the tube and which moved under the action of the external forging or shaping dies and stretched the metal of the tube out and into the depressions or corrugations in the forging-dies. In this manner the tube was formed into serpentine shape, but the metal composing the side walls of said tube was drawn or stretched out into the depressions of the external shaping-dies, whereby said walls were left thinner in some places than in others and produced a header which was weak in spots. This procedure was followed because it was thought necessary to start with a tube having the same cross-sectional area as the finished header, it not being considered possible to upset the straight side walls of the header into the serpentine form. By reason of this same erroneous belief it has also been proposed to form such header by pressing the top and bottom walls down into corrugations or depressions in an internal mandrel or die, which depressions in the header, however, were in the form of pockets in the upper and lower faces thereof and did not extend entirely across such faces, so that the side walls of the header were practically of the same shape that they were prior to the shaping process. These defects in the old processes of manufacturing serpentine headers were due, as above stated, to the belief that it was impossible to upset the metal composing the side walls of the header into serpentine form.

It is the object of my invention to overcome these defects in the old processes of manufacturing these headers; and to this end it consists, generally stated, in taking a tube rectangular in cross-section in which one dimension is greater than that of the finished article and pressing portions of the top and bottom walls inward for their full width, whereby the header is shaped in serpentine form and the side walls of the header are upset to conform to the serpentine shape of the header.

Figure 2:
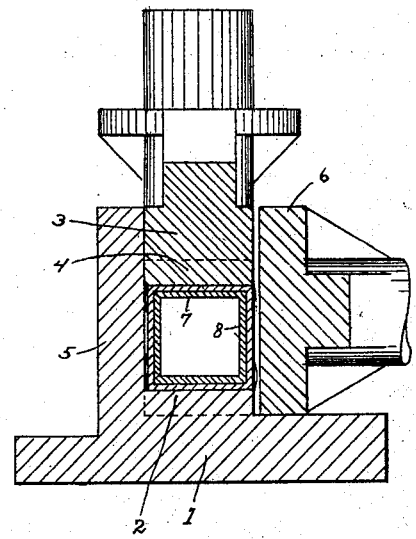
Figure 5:
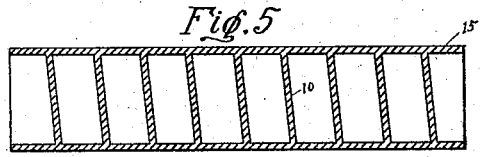
Figure 3:
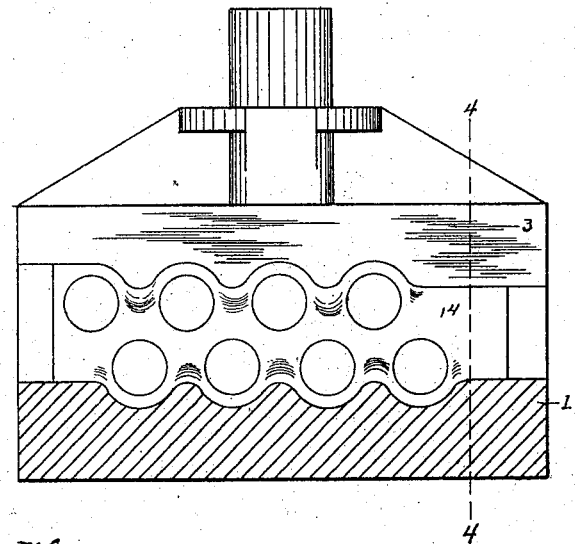
Figure 4:
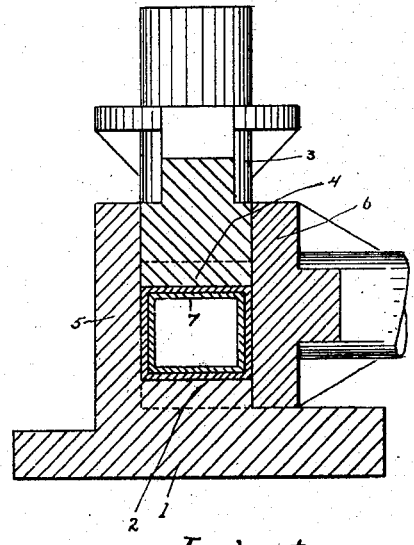

In the accompanying drawings, Figure 1 is a longitudinal vertical section of a form of apparatus suitable for carrying out my invention. Fig. 2 is a vertical transverse section of the same on the line 2 2, Fig. 1, with the upper die depressed. Fig. 3 is a side view of the same with the upper die depressed and one of the side dies removed. Fig. 4 is a vertical transverse section of the same on the line 4 4, Fig. 3, with the dies fully closed; and Fig. 5 is a horizontal longitudinal section of the mandrel.

The apparatus illustrated comprises a lower stationary die 1, having a sinuous or corrugated working face 2, and a movable upper die 3, provided with a similar sinuous or corrugated working face 4. Suitably secured to or formed integrally with the lower die 1 is a flat-faced stationary side die 5, and opposite the same is a similar flat-faced movable side die 6. The movable dies 3 and 6 are actuated, preferably, by hydraulic cylinders; but they may be actuated by any equivalent mechanism—such as cams, eccentrics, toggle-levers, and the like—it being desirable that the mechanism be such that these dies can be readily moved inward and outward. In connection with these dies I employ a suitable rigid internal mandrel or support for the tube while being shaped. The specific mandrel shown comprises a hollow body 7, which is made of cast-iron, said body having the flat side walls 8 and the sinuous or corrugated top and bottom walls 9 and being strengthened or supported by the webs 10, extending in a straight line between the sinuous top and bottom walls 9. The side walls of this mandrel are perforated, as at 11, in order to lighten the same. It will be observed that the corrugations 12 on the top and bottom walls of the mandrel and webs 10, as well as the corrugations 13 on the top and bottom dies, extend at an angle or obliquely across the mandrel and the dies, respectively. The object of this is to form a header which is adapted to a boiler having inclined water-tubes; but in case the header is to be used on a boiler having horizontal water-tubes the corrugations of the dies and mandrel and the webs 10 of the latter will extend straight across the same.

Various other forms of internal support or mandrel may be employed—such, for instance, as a block of wood of suitable shape sheathed with metal or a mandrel made up of sections or blocks which are capable of being secured together, so as to form a rigid body—it being merely essential for the purpose of my invention that the mandrel shall present a rigid support or one which will not move or yield under the action of the external dies and shall be of a shape corresponding to the external dies and the article to be made and shall thereafter be capable of being removed from the shaped article.

In carrying out my invention by means of the apparatus disclosed a tube 14, rectangular in cross-section and of an internal width equal to the external width of the mandrel and of an internal height sufficient to receive the mandrel, is first heated to a suitable forging heat and is then slipped over the mandrel 7 and, together with the same, is placed in the shaping-dies on the corrugated face 2 of the lower stationary die. The movable side die 6 is then brought against the side die of the tube, thereby confining the same between the die 6 and the die 5, but preferably not clamping the same firmly. The top die 3 is then brought down, thereby pressing the top wall of the tube down into the corrugations 12 on the upper face of the mandrel and pressing the mandrel down, so that the lower wall of the tube is carried down into the corrugations 13 in the die 1, and both the upper and lower walls of said tube are pressed in against the mandrel 7 to conform to the shape of the same. The top and bottom dies 1 and 3 are of a width equal to the external width of the tube 14, so that in this action not only are the top and bottom walls of the tube pressed in against the mandrel, but the side walls of the tube are upset—that is, the metal between the points 15 and 16 is pressed down into the metal between the points 16 and 17, or, in other words, the height of the entire length of the side walls of the tube 14 is reduced an amount equal to the distance between the points 15 and 16. This upsetting of the side walls of the tube may cause said side walls to buckle slightly and be irregular in shape, as shown in end view, Fig. 2, and side view, Fig. 3. After the top die 3 has been pressed down firmly the side die 6 is then moved up tightly, whereby the tube and mandrel are pressed firmly by said die against the side die 5, and the side walls of the tube, being squeezed between the flat walls 8 of the mandrel and the dies 5 and 6, are flattened out and the metal caused to flow and distribute itself evenly throughout the said side walls. In the practical carrying out of this process it may even be found necessary to give the dies 3 and 6 alternate slight inward and outward movements, thereby securing a gradual and progressive upsetting and shaping of the metal in the side walls of the tube. After the header has been thus shaped the mandrel is removed from the same, and with the specific form of mandrel shown—that is, one composed of cast-iron—it is broken out by means of a bar. In case of a sectional mandrel, however, it will be removed piece by piece.

It will thus be seen that my process results in a header the side walls of which have been upset instead of stretched, as in the old methods, thereby producing a header which is not weak at any one or more points. It will also be observed that in the carrying out of this method it is necessary to start with a tube which is of a greater dimension in one direction—as, for instance, in height—than the finished header and that the same must be supported internally by means of a rigid body, so that there is no possibility of the tube collapsing at any one or more parts and no possibility that any part of the mandrel shall move under the action of the external dies, whereby the metal might become stretched instead of upset.

While I have shown my invention applied to the formation of serpentine boiler-headers, I wish it understood that it is not limited thereto, but can be adapted to the formation of various tubular articles which are rectangular in cross-section and have two substantially flat and parallel side walls by merely changing the shape of the upper and lower compressing-dies and of the mandrel to correspond thereto. Neither do I wish to be limited to the specific form of mandrel shown, as any device or means which will support the tube interiorly will answer the purpose.

What I claim as my invention, and desire to secure by Letters Patent, is—

1. The method of shaping tubular wrought-metal articles of varying cross-section longitudinally, which consists in heating a tube rectangular in cross-section, and then subjecting the same exteriorly on opposite side faces for the full width thereof to pressure in opposition to an internal support, whereby the remaining side walls are upset and the article shaped.

2. The method of forming wrought-metal tubular articles, which consists in heating a tube rectangular in cross-section, supporting said tube on the interior at alternately-opposite points, and then while so interiorly supported pressing the intervening portions of the top and bottom walls of said tube inward for the full width of said walls, whereby the side walls are upset and the article shaped.

3. The method of shaping tubular wrought-metal articles of varying cross-section longitudinally, which consists in taking a tube rectangular in cross-section which is larger in one dimension than the finished article, heating the same, supporting said tube on the interior, and then subjecting the same exteriorly on opposite side faces for the full width thereof to pressure in the direction of its excessive dimension, whereby the remaining side walls are upset and the article shaped.

4. The method of forming wrought-metal tubular articles of varying cross-section longitudinally, which consists in heating a tube rectangular in cross-section, supporting the same on the interior, and while so interiorly supported pressing the top and bottom walls of said tube inward for the full width thereof, whereby the side walls are upset, and then subjecting said side walls to external pressure against an internal support whereby they are smoothened and the metal properly distributed.

5. The method of shaping wrought-metal tubular articles of varying cross-section longitudinally, which consists in heating a tube rectangular in cross-section, supporting the same on the interior, and while so interiorly supported subjecting the said tube alternately to pressure on its top and bottom faces for the full width thereof, and to pressure on the side walls, whereby the side walls are progressively upset and the metal therein smoothened out and properly distributed.

6. The method of shaping wrought-metal tubular articles of varying cross-section longitudinally, which consists in heating a tube rectangular in cross-section, supporting the same internally and confining the side walls of the tube internally and externally, and then pressing portions of the top and bottom walls inward for the full width thereof, whereby the side walls of the tube are upset and the article shaped.

In testimony whereof I, the said JAMES P. SNEDDON, have hereunto set my hand.

JAS. P. SNEDDON.

Witnesses:
O. D. EVERHARD,
E. E. BAKER.